July 29, 1969 HUGH L. DRYDEN 3,458,702
DEPUTY ADMINISTRATOR OF THE NATIONAL
AERONAUTICS AND SPACE ADMINISTRATION
TELESPECTROGRAPH
Filed Aug. 24, 1965 3 Sheets-Sheet 1

INVENTORS
GEORGE A. AMEER
RICHARD M. WALTERS

BY

ATTORNEYS

July 29, 1969  HUGH L. DRYDEN  3,458,702
DEPUTY ADMINISTRATOR OF THE NATIONAL
AERONAUTICS AND SPACE ADMINISTRATION
TELESPECTROGRAPH Filed Aug. 24, 1965  3 Sheets-Sheet 3

INVENTORS
GEORGE A. AMEER
RICHARD M. WALTERS

BY

ATTORNEYS

United States Patent Office 3,458,702
Patented July 29, 1969

3,458,702
TELESPECTROGRAPH
Hugh L. Dryden, Deputy Administrator of the National Aeronautics and Space Administration, with respect to an invention of George A. Ameer and Richard M. Walters, Glenshaw, Pa.
Filed Aug. 24, 1965, Ser. No. 487,352
Int. Cl. G01t 1/16; G01j 3/42; H01j 39/00
U.S. Cl. 250—83.3                           4 Claims

ABSTRACT OF THE DISCLOSURE

A telespectrograph for simultaneous analysis of three spectral ranges lying generally in the UV, visible, and IR, and especially suitable for analyzing the upper atmosphere by tracking bodies reentering the atmosphere at high velocities.

The invention described herein may be manufactured and used by or for the Government of the United States of America for governmental purposes without the payment of any royalties thereon or therefor.

This invention relates generally to a precision optical instrument and more particularly to a tracking telespectrograph.

The tracking telespectrograph is a precision optical instrument used to track the reentry flight of a space vehicle or satellite and record on film a continuous spectrum of its light output and supplementary sequential engineering data with respect to real time. The film is subsequently used to determine the amount and spectral distribution of the radiation from an object reentering the earth's atmosphere at so-called hyperbolic velocities. In addition, a tape recorder is utilized to record infrared radiation as sensed by the various detectors of the tracking instrument. Both from a theoretical and a practical standpoint the exploration of space has developed an interest by scientists in the constituents thereof. The relatively inaccessible outer regions of the atmosphere are of interest due to their affect on vehicles or bodies reentering the earth's atmosphere. In order to determine the affect of reentry on the body, the identification of the elements constituting the outer regions of the earth's atmosphere become significant. Bodies reentering the atmosphere break down the air molecules and in so doing cause radiation of light. Because of the inaccessibility of the outer atmosphere, it becomes necessary for study thereof to be conducted by ground instrumentation. Since each element has its own peculiar signature in the spectrum, recordation of the light intensity or radiation from the reentering object provides a means of obtaining the number and identification of the constituent elements of the outer atmosphere. Accordingly, recording the spectrum provided by a reentering body gives a step-by-step breakdown of the constituent elements and provides a means of determining the chemistry of the outer atmosphere by merely referring to the dominant lines of the spectrum and utilizing the reference book signatures of the various elements.

Prior methods of attempting to obtain the chemical constituents of the outer atmosphere have been substantially ineffective. Generally, the attempts to determine the chemistry have involved obtaining samples and subsequently trying to evaluate and analyze the elements involved. These samples were obtained in various ways, for example, by ascent of lighter-than-air vehicles or capture of a portion of the atmosphere during reentry of a space vehicle. These methods have obvious disadvantages and are unreliable due to the inability to determine the precise location or altitude at which the sample was acquired. Also, the disadvantage of obtaining a sample over a considerable distance, by reentry vehicles, prevented a step-by-step or exact location of sample determination.

In order to overcome the disadvantages of the prior art, the instant invention contemplates the use of a telescope for obtaining the radiation from a reentering body, orienting the image obtained and directing the radiation upon a diffraction grating to provide parallel bundles of light covering the spectrum and reflecting these bundles to various recording and utilization devices.

It is an object of the instant invention to provide an optical instrument for gathering information regarding the plasma sheet surrounding a reentry vehicle.

Another object of the instant invention is to provide an instrument for obtaining data regarding the phenomena at reentry speeds into the earth's atmosphere from space.

Still another object of the instant invention is to provide a novel means for recording the radiation intensity of reentry bodies.

A further object of this invention is to provide a precision optical instrument for obtaining and recording the spectra created by a vehicle during reentry.

A still further object of this invention is to provide a precision optical instrument having an image rotation assembly for positioning the small direction of an image so it is parallel to the direction of dispersion of a diffraction grating to allow maximum spectrum resolution.

An added object of the instant invention is to provide a precision optical instrument for obtaining the image radiated by a reentry vehicle and orienting that image for dispersion by a diffraction grating and providing the necessary mirrors and reflecting elements to direct the respective bundles of radiation to recording and utilizing devices.

Yet another object of this invention is to provide a precision optical instrument for obtaining and recording data of radiation from reentering vehicles in spectral form for subsequent study and evaluation as to the constituent elements of the outer atmosphere.

Generally, the foregoing and other objects are accomplished by utilizing a cassegrain-type primary optical system in a telescope that obtains the radiated image and deflects the incoming light rays to an optical system which contains an image rotater and a plurality of reflectors for directing the light rays of the visible order to a camera, the zero order radiation to a photomultiplier and the infrared radiation to an infrared detector assembly. The film from the camera and the recorded data from the infrared detectors provide permanent means for evaluation of the data obtained.

A more complete appreciation of the invention and many of the attendant advantages thereof will be readily apparent as the same becomes better understood by reference to the following description when considered in connection with the accompanying drawings wherein.

Figure 1:
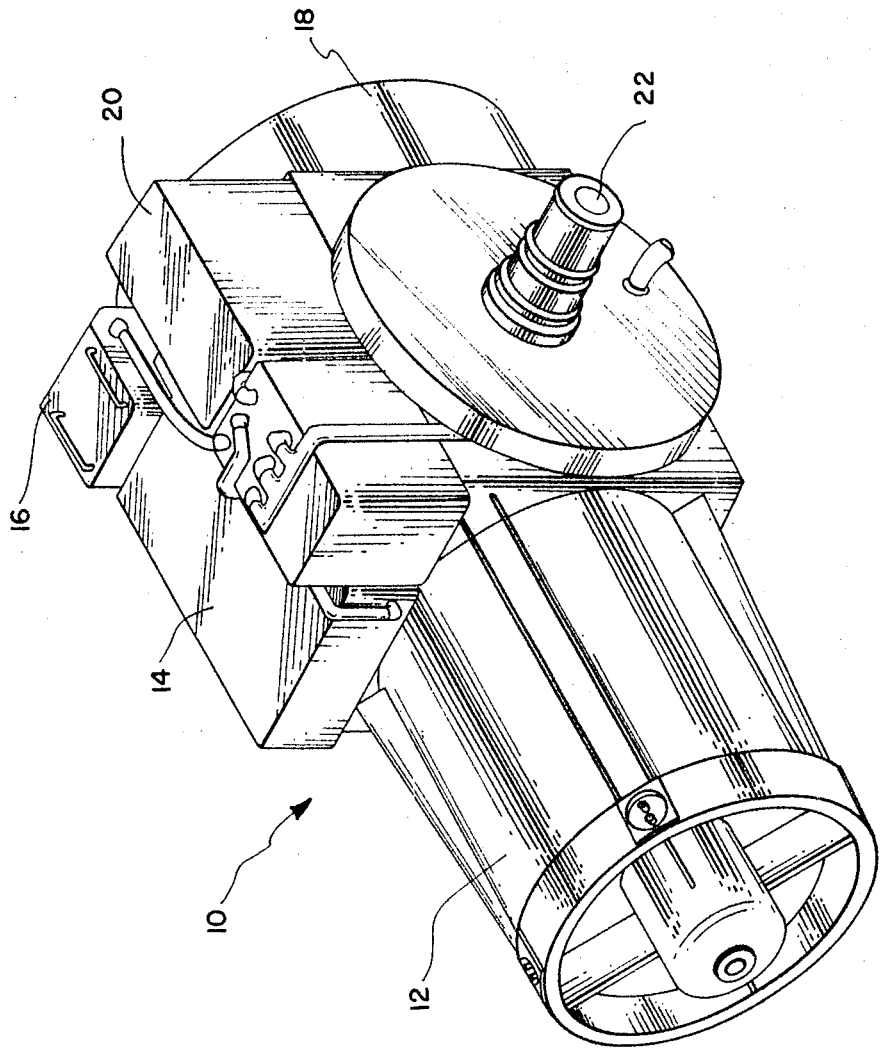
FIG. 1 is a diagrammatic perspective view of a telespectrograph incorporating the instant invention.

Referring now to the drawings and more particularly to FIG. 1 wherein a tracking telespectrograph, generally designated by numeral 10, is shown as comprising telescope assembly 12 and spectrograph assembly 14. Camera 16 is mounted adjacent the spectrograph and is utilized as will be described more fully hereinafter. Primary mirror cell 18 operates in conjunction with pressure control system 20, as disclosed in copending application Ser. No. 482,313 filed Aug. 24, 1965. All of the elements rotate about trunnion 22 in order to provide for following the vehicle being tracked in elevation.

Figure 2:
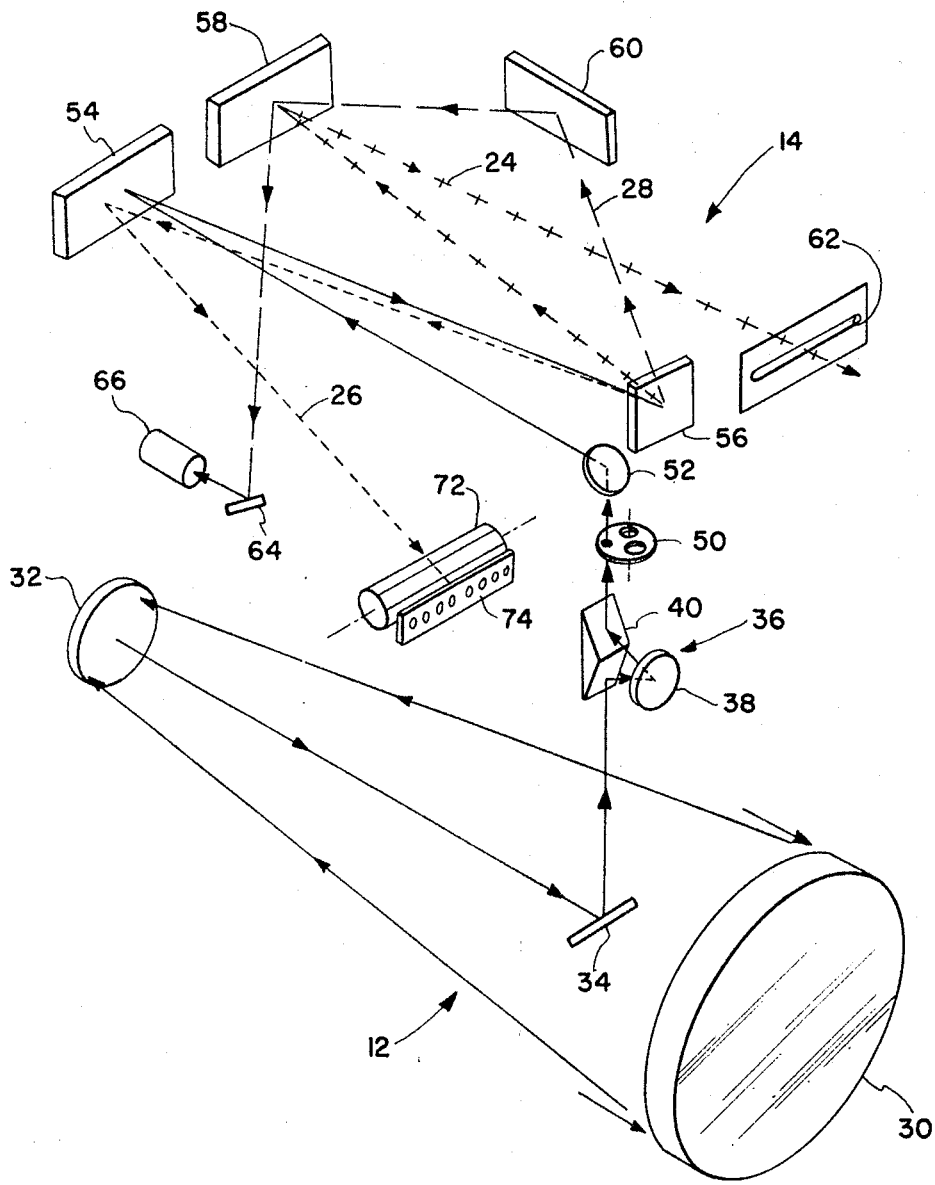
FIG. 2 is a diagrammatic view of the optical path of the instant invention.

Referring now to FIG. 2, primary mirror 30 is preferably a Pyrex primary paraboloid supported across its back and circumference by pneumatic flexure supports as described in the hereinabove referred to copending application. Secondary mirror 32 is a Pyrex hyperboloid and may be manually adjusted axially and radially or tilted by both coarse and fine adjustments located behind the reflector. Diagonal reflector 34 receives the image from secondary mirror 32 and reflects it from the telescope assembly 12 to spectrograph assembly 14. Diagonal mirror 34 is forward of the primary vertex and deflects the incoming light rays up to spectrograph assembly 14 which is mounted along with the other subassemblies referred to hereinabove on the flat surface on top of the telescope center casting.

As best seen in FIG. 2, spectrograph assembly 14 includes K-mirror assembly 36 having reflector 38 and prism 40 for rotating the image to a position such that the small direction is made parallel to the direction of dispersion provided for by diffraction grating 56 thereby allowing for maximum spectrum resolution. K-mirror assembly 36 is a conventional optic device and in one embodiment of the instant invention is capable of rotating the image from five to fifteen degrees. Thus insuring that the image is parallel to the serrations of diffraction grating 56. Field stop 50 may be provided with three different angular fields of view which are selected by rotating a turret of conventional design, not shown. Radiation emerging from field stop 50 is directed to collimating mirror 54 by diverging mirror 52. Collimating mirror 54 renders the radiation parallel and directs it toward diffraction grating 56.

Diffraction grating 56 disperses the radiation and directs it as parallel bundles in varying directions depending upon the wavelength variation and the angle of the grating. In normal operating, visible radiation 24 is directed toward rear reflector 58, mirrored infrared radiation 26 is directed toward collimating mirror 54 and zero order radiation 28 from grating 56 is directed toward side mirror 60. Visible radiation 24 is focused by rear reflector 58 through aperture 62 to the camera film plane for recording by a camera, not shown. Mirrored infrared radiation 26 is focused by collimating mirror 54 onto eight infrared detectors which may be positioned along the infrared focal plane as will be described more fully hereinafter. Side reflector 60 directs zero order radiation 28 toward folding mirror 64 which forms an image in white light of the radiation on the surface of photomultiplier 66. The output of photomultiplier 66 is used to control the rate of speed of the film for the camera, not shown, so that the exposure time of a particular region of film is dependent on the intensity of light received on photomultiplier 66.

Figure 3:
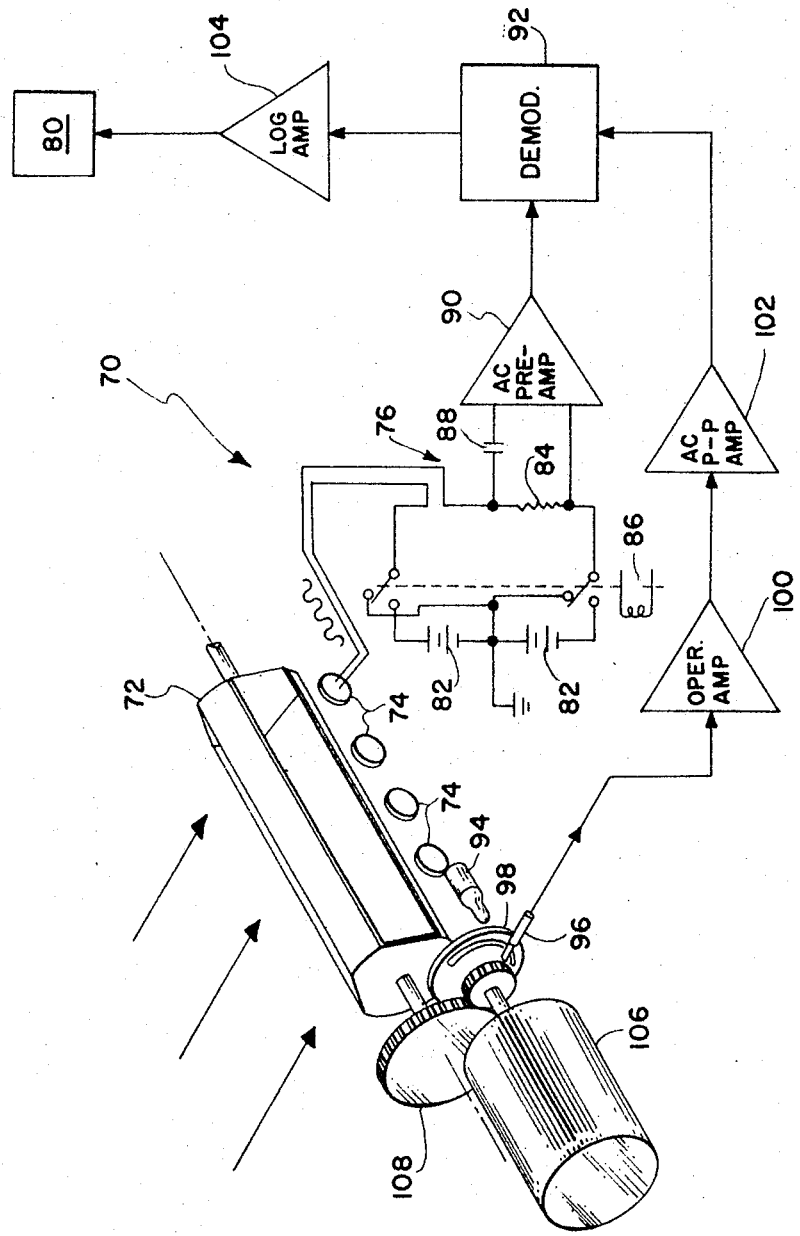
FIG. 3 is a diagrammatic view of the infrared detection system of the instant invention.

FIGURE 3 shows infrared detector assembly 70 in diagrammatic form. The infrared radiation is directed through three-bladed chopper 72 which is rotated at a rate of 66.6 revolutions per second, by motor 106 and gears 108, to provide a 200 cycle per second pulsating radiation input to eight infrared detectors or pickups 74. This may vary depending on the situation. Each IR pickup is basically a photoconductive cell the resistance of which varies in direct proportion to the intensity of the infrared radiation. There are eight separate amplifier networks 76 and output signals from each network are fed to eight corresponding channels of tape recorder 80. Two 45 volt batteries 82 are connected in series to provide a 90 volt potential across infrared detectors 74 and a series connected 600K metal film resistor 84. When relay 86 is energized, the resistance of IR detector 74 is changed, proportional to the IR radiation intensity on the detector, which causes the voltage drop across resistance 84 to vary. The voltage output, which is coupled through capacitor 88 to preamplifier 90, is in the form of a 200 cycle per second sinusoidal alternating current signal. This signal is obtained by three-bladed chopper 72. The 200 cycle per second output of preamplifier 90 is applied to one side of a full-wave bridge demodulator 92. At the same time, a separate reference light source 94 is also illuminating a reference photosensitive detector 96 through 200 cycle per second one-bladed chopper 98. The output of the reference detector 96 is a 200 cycle per second sinusoidal signal which is preamplified by operational amplifier 100, fed through push-pull amplifier 102, and applied to the reference input of demodulator 92. The demodulator output is a direct current signal, whose amplitude is proportional to the infrared light intensity on detector 74. It is applied through logarithmic amplifier 104 to the respective tape recorded channels provided for infrared recording. It should be noted that there are eight separate signal amplifiers 90 feeding eight demodulators 92. However, only one reference source and amplifier network is utilized for the reference input to each demodulator 92.

OPERATION

A vehicle entering the outer atmosphere from space causes breakdown of air molecules which is of interest with regard to the constituent elements as well as for data to assist in design of reentry vehicles. Of particular interest, is the radiation from the air before the reentering body becomes heated to incandescense. To detect this radiation, the largest practical collector and most sensitive detectors are need. The air molecules compressed ahead of the reentry vehicle become hot, so hot in fact that several complex physical and chemical reactions occur with incredible rapidity. The instant invention provides a device for obtaining and recording data necessary in solving the problems of reentry. As radiation is emitted by the reentry vehicle, a large reflecting telescope 12 obtains the image and reflects it from primary mirror 30 to secondary mirror 32 from which it is directed to diagonal mirror 34 and out of the telescope assembly.

The image from telescope assembly 12 is projected onto K-mirror assembly 36 to allow for orientation of the distant object image on field stop 50 so that the image can be rotated to a position such that it is made parallel to the direction of dispersion by grating 56, thereby allowing for maximum spectrum resolution. The light ray is projected from K-mirror assembly 36 to field stop 50 which permits selection of the desired angular field of view. Diverging mirror 52 directs the light ray coming from field stop 50 onto collimating mirror 54 where the image is rendered parallel and directed to diffraction grating 56. Grating 56 disperses the radiation depending on the wavelength variation and the angle of the grating.

Radiation between 9000 and 4500 angstroms is directed by grating 56 onto rear reflector 58 in the first order and radiation between 4500 angstroms and 2250 angstroms is directed by grating 56 onto rear reflector 58 in the second order. Hence, radiation in the region between 9000 and 2250 angstroms, including the visible, is directed through aperture 62 for recording on the film of the camera (not shown). In this region there will be overlapping spectra at all wavelengths for which the film is sensitive to both first and second order radiation.

The mirrored infrared radiation from approximately .9 microns to 5.5 microns is directed by grating 56 to collimating mirror 54 from which it is reflected to infrared detection system 70. Three-bladed rotating chopper 72 rotates at a rate of 66.6 revolutions per second to provide a 200 cycle per second pulsating radiation input to detectors 74. Each of detectors 74 is set up to obtain the infrared radiation over a predetermined wavelength band. The 200 cycles per second output of preamplifier 90 is applied to one side of demodulator 92. Simultaneously, reference light source 94 illuminates reference detector 96 through one-bladed chopper 98. The output of reference detector 96 is a 200 cycles per second sinusoidal signal which is preamplified by amplifier 100, fed through amplifier 102 and serves as the reference input of demodulator 92. The amplitude of the output of demodulator 92 is proportional to the infrared light intensity on detector 74. It is applied through logarithmic amplifier 104 to the respective channel of recorder 80. Thus, it is seen that the visible radiation is recorded on film and the infrared radiation intensity is recorded on a tape recorder.

The zero order radiation is directed from grating 56 to side mirror 60 from which rear reflector 58 directs it to folding mirror 64. Mirror 64 focuses the zero order light beam onto photomultiplier 66, the output of which is used to control the rate of speed of the film in the camera.

The instant invention provides a compact and easily operable precision optical instrument capable of obtaining spectra data on reentry and astronomical phenomena. It permits the acquisition and recording of radiation data useful in analyzing the breakdown of air molecules of outer space when disturbed by reentry.

Obviously, many modifications and variations of the subject invention are possible in the light of the above teachings. It is, therefore, to be understood that within the scope of the appended claims the invention may be practiced otherwise than as specifically described.

What is claimed as new and desired to be secured by Letters Patent of the United States is:

1. A spectroscope assembly comprising: input means for collecting radiation for analysis and directing it in a path; a collimating mirror positioned in the path so as to intercept said radiation and reflect it in parallel paths; diffraction grating means positioned in the said paths to reflect and disperse said radiation in various paths at various angles depending on the wavelength of the incident radiation; a plurality of reflector means including a first reflector means spaced from said collimator mirror in a portion of said dispersal paths and a second reflector means spaced from said first reflector means positioned in another portion of said dispersal paths and directing dispersed radiation from said diffraction grating means to said first reflecting means; and a plurality of detector means including a first detector means positioned to receive radiation reflected from said first reflector means intercepted in said dispersal paths and a second detector means positioned to receive radiation directed from said grating means to said second reflector means and reflected from said first reflector means whereby dispersed radiation is efficiently transported from the grating means to the detectors.

2. The assembly of claim 1 further including means positioning said collimator mirror to intercept another portion of said dispersed radiation; and a third detector means positioned to receive such radiation reflected therefrom.

3. The assembly of claim 2 wherein said second detector means comprises: chopper means for pulsing the infrared radiation; detector means for determining the intensity of the infrared radiation; means for amplifying the signal from said detector means; demodulator means for demodulating the amplified signal; means for providing a reference signal to said demodulator means; and tape recorder means having a channel for each of said detector means whereby the intensity of radiation between 1.0 and 6.0 microns is obtained by said detector means and recorded for subsequent use.

4. The assembly of claim 1 wherein said input means includes a telescope means for collecting radiation emitted at substantial distances from the instrument.

References Cited

UNITED STATES PATENTS

| | | |
|---|---|---|
| 2,856,531 | 10/1958 | Brouwer. |
| 2,948,185 | 8/1960 | Ward et al. |
| 2,993,121 | 7/1961 | Esher. |
| 3,086,434 | 4/1963 | Edelstein. |
| 3,090,278 | 5/1963 | Saunderson. |
| 3,239,674 | 3/1966 | Aroyan. |
| 3,319,071 | 5/1967 | Werth et al. |

OTHER REFERENCES

"Observing Plans for October's Eclipse-II," R. J. Low Sky and Telescope, July 1958, pp. 450–452.

ARCHIE R. BORCHELT, Primary Examiner

MORTON J. FROME, Assistant Examiner

U.S. Cl. X.R.

95—10; 356—96